Figure 1:
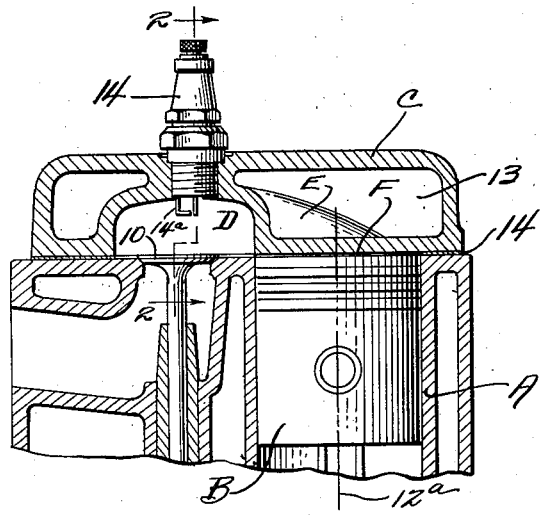

Jan. 5, 1932.       L. P. KALB       1,839,560

INTERNAL COMBUSTION ENGINE

Filed May 2, 1928

INVENTOR.
Lewis P. Kalb
BY
W. W. Harris
ATTORNEY.

Patented Jan. 5, 1932

1,839,560

UNITED STATES PATENT OFFICE

LEWIS P. KALB, OF DETROIT, MICHIGAN, ASSIGNOR TO CONTINENTAL MOTORS CORPORATION, OF DETROIT, MICHIGAN, A CORPORATION OF VIRGINIA

INTERNAL COMBUSTION ENGINE

Application filed May 2, 1928. Serial No. 274,383.

This invention relates to internal combustion engines and refers more particularly to an improved cylinder and cylinder head construction.

One object of my invention resides in providing an engine of increased efficiency and of non-detonating characteristics.

In the poppet valve type of engine it is customary to locate the intake and exhaust valves to one side of the associated engine cylinder, the valve chamber also serving as a combustion chamber and having a communicating passage with the cylinder. This general type of engine has a tendency to detonate the cause of which has been the subject of considerable discussion. I have discovered that by providing a combustion chamber and valve arrangement of the character described hereinafter, the engine operates more efficiently, with more power and without detonation.

I have provided a combustion chamber extension or a secondary combustion chamber which communicates with the valve combustion chamber, and is a relatively small volume of the whole combustion chamber and is a well cooled chamber. Thus the combustion chamber extension overlies a portion of the piston preferably as remote as possible from the piston center which is the hottest portion of the piston face, the illustrated embodiment of my invention showing the combustion chamber extension overlying a peripheral segment of the piston.

One important feature of my invention resides in the arrangement of the valves with respect to the combustion chamber and combustion chamber extension, whereby the intake mixture will cool the exhaust valve, thus reducing the tendency for the engine to detonate or pre-ignite. As an additional feature of my invention, the intake gases cool the spark plug terminals.

With my construction the end of the combustion chamber extension is preferably comparatively remote from the valve or main combustion chamber proper and from the spark plug so that the gases contained in the combustion chamber extension are fired subsequently to the burning of the gases in the valve combustion chamber. Such a remote chamber would give rise to detonation were it not sufficiently cooled to reduce the temperature at such a location below its detonating point as the pressure builds up in advance of the flame curtain from the spark plug. My invention provides for maintaining the combustion chamber extension at the desired temperature to avoid detonation and results in an engine having increased power and efficiency.

Further objects and advantages of my invention reside in the combination and arrangement of parts more particularly hereinafter described and claimed.

Figure 3:
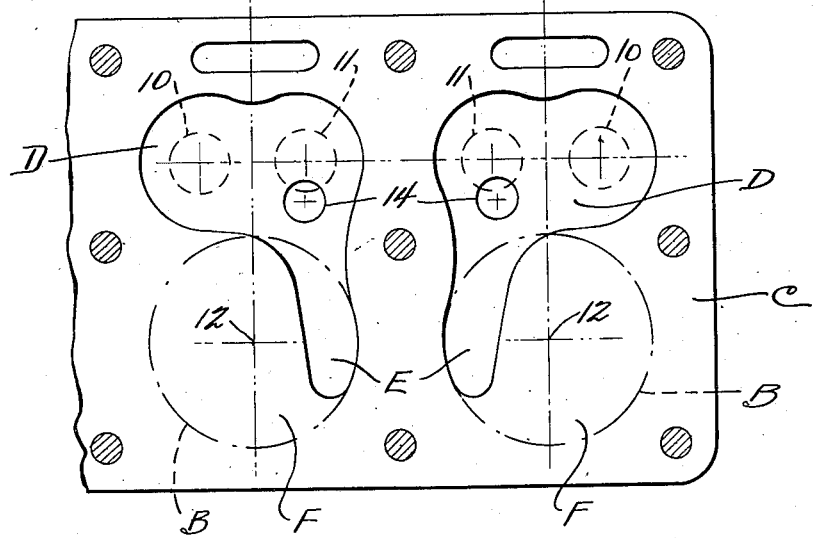
Figure 2:
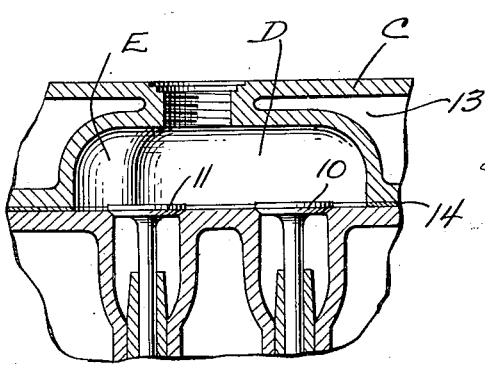

In the accompanying drawings illustrating an embodiment of my invention,

Fig. 1 is a sectional elevation view of the engine through the cylinder and valve combustion chamber thereof, Fig. 2 is a sectional elevation view through 2—2 of Fig. 1, and Fig. 3 is an inverted plan view of the cylinder head.

Referring to the drawings, reference character A represents the engine cylinder, B the piston, and C the cylinder head. Cylinder A is provided with the intake and exhaust valves 10 and 11 respectively which open into the valve or primary combustion chamber D of cylinder head C. Communicating the chamber D is a combustion chamber extension or secondary combustion chamber E, the chambers D and E comprising the total combustion chamber. The chamber E as illustrated preferably slopes downwardly toward the piston away from the valves avoiding the piston center 12 although preferably extending therebeyond, the remaining portion F of the cylinder head above the piston and cylinder preferably providing a minimum clearance above the piston, preferably the thickness of the usual gasket 14 which is customarily about $\frac{1}{16}$ of an inch. The cylinder head C has water jacket 13 which cools the wall F and thereby cools the piston face and the layer of gases trapped in the clearance above the piston. Such construction assists in preventing detonation in the combustion chamber extension. The chamber E may follow the general curvature of the piston and cylinder avoiding the piston axis 12ª. It will be noted that in the embodiment illustrated the secondary chamber E extends at least to the plane containing the piston axis 12ª.

The cylinder head has a spark plug 14 preferably located in proximity with the exhaust valve 11 and substantially at the entrance to the combustion chamber extension E from the valve combustion chamber D whereby the spark plug terminals 14ª will be cooled by intake gases in passing from intake valve 10 to chamber extension E as the piston B moves downwardly in its intake stroke.

The arrangement of valves is such that the intake gases from intake valve 10 will sweep across the exhaust valve 11 cooling the same as the intake gases pass from the intake valve 10 to the chamber extension E on the intake stroke of the piston B.

My invention thus provides an engine having excellent turbulence, with increased power and efficiency without detonation, provision being made for cooling the exhaust valve and spark plug terminals.

Various changes may be made over the particular embodiment illustrated within the scope of my invention and I do not limit my invention except as recited in the claims.

What I claim as my invention is:

1. In an engine of the character described, a cylinder, a piston, intake and exhaust valves for the cylinder, a cylinder head provided with a primary chamber to one side of the cylinder into which said valves open and also provided with a communicating secondary chamber overlying a portion of the piston remote from the center of the piston face, a spark plug located in proximity with the exhaust valve, said secondary chamber sloping downwardly from the primary chamber to a point beyond the piston axis generally following the curvature of the piston face periphery, the cylinder head having a portion thereof providing a minimum clearance for the remainder of the piston face when the piston is in its upper limit of travel, said spark plug and exhaust valve being positioned substantially at the entrance of the secondary chamber.

2. In an engine of the character described, a cylinder, a piston, intake and exhaust valves for the cylinder, a cylinder head provided with a primary chamber to one side of the cylinder into which said valves open and also provided with a communicating secondary chamber overlying a portion of the piston remote from the center of the piston face, a spark plug located in proximity with the exhaust valve, said secondary chamber sloping downwardly from the primary chamber to a point beyond the piston axis generally following the curvature of the piston face periphery, the cylinder head having a portion thereof providing a minimum clearance for the remainder of the piston face when the piston is in its upper limit of travel, cooling means for the minimum clearance of the cylinder head, said spark plug and exhaust valve being positioned substantially at the entrance of the secondary chamber.

In witness whereof, I hereunto subscribe my name this 27th day of April, A. D. 1928.

LEWIS P. KALB.